(12) United States Patent
Gihleengen et al.

(10) Patent No.: US 11,255,712 B2
(45) Date of Patent: Feb. 22, 2022

(54) DETERMINING A PRESENCE OR ABSENCE OF WATER IN A DC CASTING STARTER BLOCK : METHOD AND DIRECT CHILL APPARATUS CLAIMS

(71) Applicant: Norsk Hydro ASA, Oslo (NO)

(72) Inventors: Britt Elin Gihleengen, Ålvundeid (NO); Snorre Normann Bache, Spongdal (NO); Tore Eide, Heimdal (NO)

(73) Assignee: NORSK HYDRO ASA, Oslo (NO)

( * ) Notice: Subject to any disclaimer, the term of this patent is extended or adjusted under 35 U.S.C. 154(b) by 0 days.

(21) Appl. No.: 17/273,060

(22) PCT Filed: Jul. 25, 2019

(86) PCT No.: PCT/EP2019/070008
§ 371 (c)(1),
(2) Date: Mar. 3, 2021

(87) PCT Pub. No.: WO2020/052849
PCT Pub. Date: Mar. 19, 2020

(65) Prior Publication Data
US 2021/0341332 A1    Nov. 4, 2021

(30) Foreign Application Priority Data
Sep. 10, 2018    (NO) .................................. 20181174

(51) Int. Cl.
*B22D 11/049* (2006.01)
*B22D 11/08* (2006.01)
(Continued)

(52) U.S. Cl.
CPC .......... *G01F 23/284* (2013.01); *B22D 11/049* (2013.01); *B22D 11/081* (2013.01);
(Continued)

(58) Field of Classification Search
CPC ..... B22D 11/049; B22D 11/08; B22D 11/081; B22D 11/083; B22D 11/16; B22D 11/161
See application file for complete search history.

(56) References Cited

U.S. PATENT DOCUMENTS

| | | | | |
|---|---|---|---|---|
| 4,651,804 A | * | 3/1987 | Grimes | ................ B22D 21/007 164/455 |
| 4,724,887 A | * | 2/1988 | Jacoby | .................... C22F 1/002 164/487 |

(Continued)

FOREIGN PATENT DOCUMENTS

| | | |
|---|---|---|
| EP | 1 648 635 | 4/2009 |
| JP | 01-233050 | 9/1989 |
| WO | 2014/121295 | 8/2014 |

OTHER PUBLICATIONS

International Search Report and Written Opinion of the International Searching Authority dated Dec. 6, 2019, in International (PCT) Application No. PCT/EP2019/070008.

*Primary Examiner* — Kevin E Yoon
(74) *Attorney, Agent, or Firm* — Wenderoth, Lind & Ponack, L.L.P.

(57) ABSTRACT

A method to determine a presence or absence of water in a cavity of a starter block having a non-horizontal surface of DC casting equipment including emitting a wave using a device containing a sensor, the wave propagating along a virtual beam path, directing the wave towards the cavity of the starter block such that the wave is reflected on a horizontal surface of the water, if water is present in the cavity, or is reflected on a non-horizontal surface of the cavity of the starter block, if no water is present in the cavity, detecting the reflected wave using the sensor, or not detecting the wave using the sensor, determining that there is water present in the cavity if the sensor detects the reflected wave, and determining that water is absent in the cavity if the (Continued)

A)     B)

sensor does not detect the wave while the sensor emits the wave.

10 Claims, 1 Drawing Sheet

(51) Int. Cl.
  *B22D 11/16* (2006.01)
  *G01F 23/284* (2006.01)
  *B22D 46/00* (2006.01)
  *G01F 23/296* (2022.01)
(52) U.S. Cl.
  CPC ............ *B22D 11/161* (2013.01); *B22D 46/00* (2013.01); *G01F 23/296* (2013.01)

(56) References Cited

U.S. PATENT DOCUMENTS

| | | | |
|---|---|---|---|
| 8,365,808 B1 * | 2/2013 | Tilak | .................. B22D 27/045 |
| | | | 164/487 |
| 2002/0148593 A1 | 10/2002 | Tilak | |

* cited by examiner

DETERMINING A PRESENCE OR ABSENCE OF WATER IN A DC CASTING STARTER BLOCK : METHOD AND DIRECT CHILL APPARATUS CLAIMS

TECHNICAL FIELD

The present invention relates to methods and devices for determining whether there is water in a starter block of an equipment for casting, in particular for direct chill (DC) casting.

BACKGROUND OF THE INVENTION

In the production of metal, cast objects in various formats are produced, for example sheet ingots that are used to produce flat metal products by hot rolling and cold rolling and billets that are used to produce extruded products with different cross-sections and designs by an extrusion process.

Both sheet ingots and billets may be produced by semi-continuous casting equipment that may comprise a large number of molds (also referred to as "chills" or "moulds") arranged in lines and rows. Liquid metal is led to the molds via a manifold through from above into a cavity of each mold. The metal is cooled and at least partially solidified in when it is introduced into the mold. Primary cooling achieves the initial solidification of the metal via heat transfer through the wall of the mold. Secondary cooling may be additionally carried out by spraying water directly against the at least partially solidified cast product exiting the mold via a water gap or holes along the circumference of the mold.

The casting equipment may be placed over a casting pit with a depth corresponding to the length of the products to be cast plus the structural height of a mobile support. A total depth of such a casting pit may be in the order of 10-15 meters. The mobile support or starter block under the molds is moved downwards as the metal solidifies in order to create the longitudinal cast product which may have for example a diameter between 150 and 400 mm, depending on the intended use of the cast product, i.e. whether it is intended for a subsequent rolling process or extrusion process. The starter block may comprise a cavity for supporting the cast product exiting the chill. A casting equipment of the mentioned type is also referred to as a "direct chill (DC) casting equipment" and is e.g. described in European Patent EP1648635B1, the whole content of which is incorporated herein by this reference.

As mentioned, for casting, water is used as a cooling medium and is led through channels in the mold and/or is directly sprayed onto the surface of the cast product exiting the mold. It can occur that water accumulates on or in the starter block before a casting operation is started. When the hot metal comes into contact with that water, the water may heat up and change its phase from the liquid phase to the gas phase resulting in a large volume expansion. Further, the water molecules may undergo a reaction when in contact with the hot metal and dissociate into an explosive hydrogen and oxygen gas mixture. The large volume expansion as well as the explosive gas mixture may pose a health and safety hazard for persons operating the casting equipment and may as well have a negative influence on the operational efficiency of the casting equipment.

The present invention aims to solve the afore-mentioned issues.

SHORT DESCRIPTION OF THE INVENTION

The inventors have found three reasons that may result in water being present in the cavity of a starter block before a casting operation is started. In a casting operation, after the billets are lifted out, the starter blocks are submerged in the used cooling water that may accumulate in the casting pit. For the next casting operation, the starter blocks are raised above the water and a worker removes the water with air nozzle.

However, due to limited accessibility and the geometry of the casting equipment, it can happen that not all water is removed from the starter block by the worker. Further, just before casting starts, the cooling water flows on the outside of the starter block. If there is small a defect on the starter block (like a bit of metal sticking out), the water direction can change, and the water may flow via said defect into the crack between the mold and the starter block, and the water may then accumulate in the cavity of the starter block. A common reason for the presence of water in the cavity of the starter block is also thought to be an improper spatial alignment of mold and starter block when not aligned.

When a casting table is lowered over the casting pit before casting, it may happen that pieces of aluminium from a previous casting operation remain on the "laydown area" so that the casting table is not laying perfectly flat. This can result in a gap between the starter block and mold for the water to enter into the cavity of the starting block. It is standard procedure that a worker checks the cavities of starter blocks for water before a casting operation is started. If the worker identifies the presence of water in the cavity of a starter block, the water is removed using a hose with pressurized air. The present inventors have found that often water, that is present, is not identified by the worker, resulting in a high risk that an explosion happens when hot metal comes into contact with the metal and/or a lower operational efficiency when the casting operation has to be interrupted to remove the water.

To solve the afore-mentioned issues and to enable a more efficient DC casting process, according to an aspect, the present invention provides a method to determine a presence or absence of water in a cavity of a starter block having a non-horizontal surface of DC casting equipment, the method comprising emitting a wave, in particular electro-magnetic radiation or an ultrasonic wave, using a sensor, the wave propagating along a virtual beam path, directing the wave towards the cavity of the starter block such that the wave is reflected on a horizontal surface of the water, if water is present in the cavity, or is reflected on a non-horizontal surface of the cavity of the starter block, if there is no water present in the cavity, detecting the reflected wave using the sensor that is arranged such that it is in the beam path of the wave reflected on the horizontal surface of the water if water is present in the cavity, or not detecting the wave using the sensor if water is absent in the cavity and the wave is reflected by the non-horizontal surface of the cavity, determining that there is water present in the cavity if the sensor detects the reflected wave, and determining that water is absent in the cavity if the sensor does not detect the wave while the sensor emits the wave.

According to embodiments, the wave may be directed towards the cavity of the starter block such that the beam path of the wave may intersect the cavity at the vertically lowest portion of the cavity.

According to a further aspect, the invention provides a device D to determine a presence or absence of water in a cavity of a starter block of DC casting equipment, wherein the cavity comprises a non-horizontal surface, the device comprising a sensor for generating a wave, in particular electro-magnetic radiation or an ultrasonic wave, and for detecting a reflected wave, wherein the sensor is arranged and configured such that the sensor detects the wave that is reflected on a horizontal surface of water in the cavity and does not detect the wave reflected on the non-horizontal surface of the starter block, a controller configured to determine that water is present in the cavity if the sensor detects the reflected wave and to determine that water is absent in the cavity if the sensor is not detecting the wave while the sensor is generating the wave.

According to a further aspect, the present invention provides a direct chill (DC) casting equipment comprising a casting pit, a plurality of DC casting molds arranged in the casting pit, a starter block for each casting mold of the plurality of casting molds, wherein each starter block is vertically moveable with respect to the corresponding casting mold, and wherein each starter block comprises a cavity having a non-horizontal surface for supporting a cast product, a manifold for distributing liquid metal from a reservoir to each of the casting molds of the plurality of casting molds, a device as described above to determine a presence or absence of water in the cavity of a starter block.

According to embodiments, the direct chill (DC) casting equipment may further comprise an apparatus for moving the device to determine a presence or absence of water in a cavity of a starter block of DC casting equipment such as to determine the presence or absence of water in the cavity of each starter bock of the plurality of starter blocks sequentially.

According to embodiments, the apparatus for moving the device D may comprise at least one vertical beam that is horizontally moveable on a floor surrounding the casting pit along a side of the casting pit, a horizontal beam having a longitudinal end portion that is connected to the at least one vertical beam and is moveable in a vertical direction along the vertical beam, and the device to determine a presence or absence of water in a cavity of a starter block of DC casting equipment as described above, wherein the sensor is connected to the horizontal beam and is moveable in a longitudinal direction along the horizontal beam.

According to embodiments, the apparatus for moving the device D to determine a presence or absence of water in a cavity of a starter block of DC casting equipment may comprise a first vertical beam and a second vertical beam, wherein the first and second vertical beams may both horizontally moveable and may be arranged on the floor at opposite sides of the casting pit, wherein the horizontal beam may comprise a first and a second end portion on opposite longitudinal ends thereof, and wherein the first end portion may be connected to the first vertical beam and wherein the second end portion may be connected to the second vertical beam such that the horizontal beam is vertically moveable.

SHORT DESCRIPTION OF THE FIGURES

DETAILED DESCRIPTION

Figure 1:
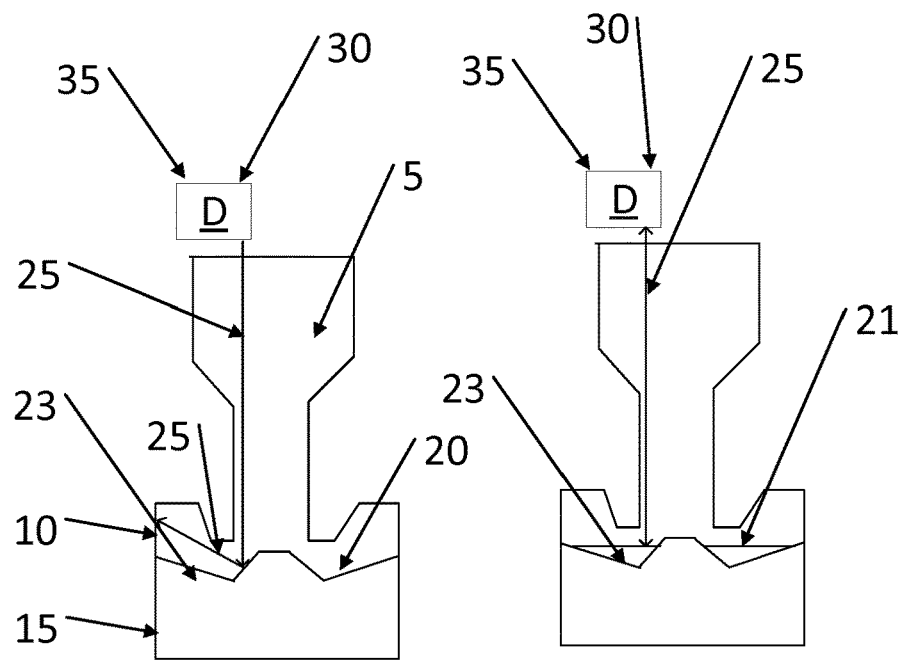
FIGS. 1a and 1b show a section through a manifold, a mold and a starter block and show the operating principle of a method according to embodiments of the invention.

FIG. 1 a schematically shows a section through a manifold 5 (also referred to as launder), a mold 10 and a starter block 15. As described above, liquid metal is led through the manifold 5 into the mold 10 in which it at least partially solidifies. The at least partially solidified metal is supported by the starter block 15. During a casting operation, the starter block 15 is continually moved vertically downwards while more metal is supplied into the mold 10 via the manifold 5. To efficiently support the at least partially solidified metal, or in other words, the cast product, the starter block 15 is provided with a cavity 20.

In this way, longitudinal cast objects such as billets or ingots may be produced. Water is used to cool down the liquid metal in the mold 10. For example, the mold 10 may be provided with channels through which water is led to maintain a high temperature gradient between the liquid metal and the mold in order to transport heat away from liquid metal. Alternatively, or in addition, water may be sprayed onto the at least partially solidified metal (that means the cast product) exiting the mold 10 to reduce the temperature of the solidified metal/cast product.

While water is an important element for efficient continuous casting as described above, it may also result in problems. This is for example because water 21 may accumulate in the cavity 20 before a casting operation is started. If liquid metal is feed into the mold 10 via the manifold and comes into contact with the water 21 in the cavity 20, the temperature of the water 21 will quickly raise, and the water 21 will evaporate resulting in a large volume increase. Said volume increase may be similar to an explosion and damage the cast product and/or the casting equipment.

FIG. 1a shows a cavity 20 that is free of water, while FIG. 1b shows an example where water 21 was accumulated in the cavity 20 of the starter block 15.

To solve the aforementioned problems, the present invention provides a method to determine a presence or absence of water in a cavity 20 of a starter block 15 of DC casting equipment. The method comprises generating a wave 25, for example by using a device D comprising a sensor 30. The wave 25 may for example be electro-magnetic radiation or an ultrasonic wave. In the following, electromagnetic and acoustic waves are referred to as "wave" as the principle of the present invention works with any type of wave or radiation. Accordingly, the sensor 30 may for example emit a laser beam or light beam, or a sound wave or any other form of radiation or wave. In this document, the propagation of the wave 25 is described by a line indicating the propagation of the wave 25. To show the propagation more clearly, arrow heads shown in FIGS. 1a and 1b show the direction of propagation of the wave 25.

The method may further comprise directing the wave 25 that was generated by the sensor 30 towards the cavity 20 of the starter block 15 such that the wave is reflected on a horizontal surface of the water 21, if water 21 is present in the cavity 20, or is reflected on a non-horizontal surface 23 of the cavity 20 of the starter block 15, if there is no water 21 present in the cavity 20.

In FIGS. 1a and 1b, as an example a cavity 20 that has rotational symmetry around a vertical central axis and comprises a plateau that is intersected by the vertical axis is shown, however a starter block 15 may according to the invention have a cavity of any geometric form as long as it comprises a non-horizontal surface.

When it is assumed that the wave 25 is reflected by a horizontal surface, the angle of incidence equals the angle of reflection, the wave 25, if it is substantially propagating in a vertical direction (downwards direction), is reflected back in the vertical direction (upwards direction) when it is reflected by the horizontal surface of water 21 in the cavity 20. Accordingly, it will be incident on the sensor 30 and can be detected by the sensor 30.

On the other hand, if the wave 25 is incident on a non-horizontal surface 23 of the cavity, it is not reflected into the direction it came from but is reflected in a different direction and dissipates so that it cannot reach the sensor 30.

Accordingly, the method may comprise detecting the reflected wave 25 using the sensor 30 that is arranged such that it is in the beam path of the wave 25 reflected on the horizontal surface of the water 21 if water 21 is present in the cavity 20, or not detecting the wave 25 with the sensor 30 if water is absent in the cavity 20 and the wave is therefore reflected by the non-horizontal surface 23 of the cavity 20. That is, the method may comprise determining that there is water 21 present in the cavity 20 if the sensor 30 detects the reflected wave 25 and determining that water 21 is absent in the cavity 20 if the sensor 30 does not detect the wave 30 while the sensor 30 generates the wave 25.

According to embodiments, the wave 25 may be directed towards the cavity 20 of the starter block 15 such that the beam path of the wave 25 intersects the cavity 20 at the vertically lowest portion of the cavity 20. In this way, also very small amounts of water can be detected in the cavity 20, as the water will accumulate in the vertically lowest area of the cavity 20. However, by directing the wave 25 to different areas of the cavity 20, the present invention does not only allow a binary WATER/NO-WATER detection, but allows to establish the precise amount of water in the cavity 20. The wave 25 may be directed to different areas of the cavity 20 by moving the sensor 30 until the reflected wave 25 is detected. Then, via the geometry of the cavity 20 and the position of the sensor 30, the amount of water 21 in the cavity 20 can be calculated.

The device D may comprise a controller connected with the sensor 30. The controller 35 may be configured to determine that there is water 21 present in the cavity 20 when a wave 25 is detected and that there is no water present in the cavity when no (reflected) wave 25 is detected while a wave 25 is generated by the sensor 30.

Figure 2:
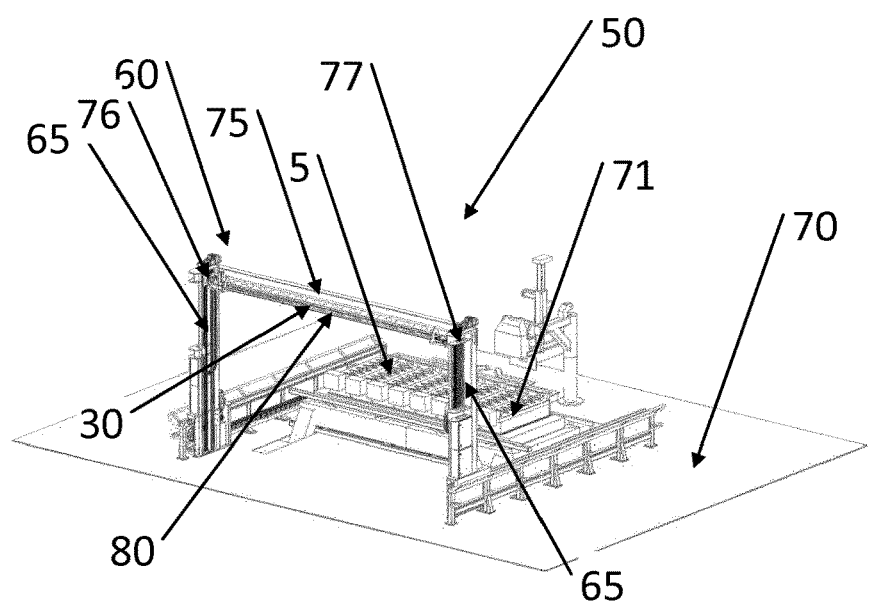
FIG. 2 shows an apparatus for moving a device D to determine a presence or absence of water in a cavity of a starter block of DC casting equipment as well as the device according to embodiments of the invention.

FIG. 2 shows a direct chill (DC) casting equipment 50 according to embodiments of the invention. The casting equipment 50 may comprise a manifold 5 and a plurality of molds 10, each mold 10 having an associated starter block 15 (not shown in FIG. 2). The molds 10 may be arranged above a casting pit 71 such that the starter blocks 15 have sufficient space to move vertically downwards in order to cast longitudinal products as described above.

The casting equipment 50 according to embodiments of the present invention comprises a device D with a sensor 30 and a controller 35 as described above.

According to embodiments, the casting equipment 50 may further comprise an apparatus 60 for moving the device D with sensor 30 such as to determine the presence or absence of water 21 in the cavity 20 of each starter bock 15 in the plurality of starter blocks 15 sequentially and/or to determine the amount of water 21 in the cavity 20 of a starter block 15 by taking several measurements with the sensor 30 while the sensor 30 is moved between measurements. The device D can be attached to the apparatus 60 in any appropriate manner known to the skilled person (not shown).

The apparatus 60 may comprise at least one vertical beam 65 that is horizontally moveable on a floor 70 surrounding the casting pit 71 along a side of the casting pit 71. The apparatus 60 may further comprise a horizontal beam 75 having a longitudinal end portion 76 that is connected to the at least one vertical beam 65 and is moveable in a vertical direction along the vertical beam 65.

The device D with the sensor 30 may be provided on the horizontal beam 75 such that it is moveable along the longitudinal direction of the horizontal beam 75.

Accordingly, the sensor 30 may be moved in three dimensions by moving the vertical beam 65 along the floor 70, by moving the horizontal beam 75 along the vertical beam 65 and by moving the sensor 30 along the horizontal beam 75.

According to embodiments, the apparatus 60 for moving the device D may comprise a first vertical 65 beam and a second vertical beam 65, wherein the first and second vertical beams 65 are both horizontally moveable and are arranged on the floor 70 at opposite sides of the casting pit 71. In this case, the horizontal beam 75 comprises a first 76 and a second end portion 77 on opposite longitudinal ends thereof. The first end portion 76 may be connected to the first vertical beam 65 and the second end portion 77 may be connected to the second vertical beam 65 such that the horizontal beam 75 is vertically moveable. As the horizontal beam 75 is supported on both longitudinal ends 76, 77 thereof by a vertical beam 65, a higher mechanical stability of the apparatus for moving the device may be achieved resulting in more precise water detection.

According to embodiments, the horizontal beam 75 may also be provided with a water removal device 80. The water removal device 80 may be movable along the horizontal beam 75 in the longitudinal direction thereof. The water removal device 80 may be configured to remove water 21 from the cavity 20 of a starter block 15 of the plurality of starter blocks.

The water removal device 80 may for example be implemented as an air nozzle through which pressurized air is flown. When the air from the nozzle is directed towards a cavity 20 comprising water 21, the water 21 may be blown out of the cavity 20. For example, if the device D comprising sensor 30 detects water 21 in a cavity 20, the water removal device 80 may be moved to that cavity 20, and the water 21 may then be removed from the cavity 20 by the water removal device 80. According to embodiments, when all starter blocks 15 of the plurality of starter blocks have been processed by determining the presence or absence of water, and, if water is present, by the removal of water, a casting operation is started.

It should be understood that the positioning of the device D with regard to the casting equipment, detection whether water is present, and corresponding water removal actions can be fully automated and controlled by a controller such as a computer or a PLC.

In one embodiment all starter blocks can be checked with regard to presence/non presence of water and following that, in a subsequent operation the process for water removal can be executed at those starter blocks having water present, if any.

In one other embodiment, the number of devices D match the number of starter blocks or one row thereof and are further arranged in a frame structure or the similar to be able to check all or at least a part of the starter blocks simultaneously. A similar arrangement can be applied for the water removal device 80.

The invention claimed is:

1. A method to determine a presence or absence of water (21) in a cavity (20) of a starter block (15) having a non-horizontal surface (23) of DC casting equipment, the method comprising emitting a wave (25), using a device (D) comprising a sensor (30), the wave (25) propagating along a virtual beam path, directing the wave (25) towards the cavity (20) of the starter block (15) such that the wave is reflected on a horizontal surface of the water (21), if water (21) is present in the cavity (20), or is reflected on a non-horizontal surface (23) of the cavity (20) of the starter block (15), if there is no water (21) present in the cavity (20), detecting the reflected wave (25) using the sensor (30) that is arranged such that it is in the beam path of the wave (25) reflected on the horizontal surface of the water (21) if water is present in the cavity (20), or not detecting the wave (25) using the sensor (30) if water (21) is absent in the cavity (20) and the wave (25) is reflected by the non-horizontal surface (23) of the cavity (20), determining that there is water (21) present in the cavity (20) if the sensor (30) detects the reflected wave (25), and determining that water (21) is absent in the cavity (20) if the sensor (30) does not detect the wave (25) while the sensor (30) emits the wave (25).

2. The method according to claim 1, wherein the wave (25) is directed towards the cavity (20) of the starter block (15) such that the beam path of the wave (25) intersects the cavity (20) at the vertically lowest portion of the cavity (20).

3. The method according to claim 1, wherein the wave comprises electro-magnetic radiation or an ultrasonic wave.

4. A Direct Chill (DC) casting equipment (50) comprising
a casting pit (71),
a plurality of DC casting molds (10) arranged in the casting pit (71),
a starter block (15) for each casting mold (10) of the plurality of casting molds (10), wherein each starter block (15) is vertically moveable with respect to the corresponding casting mold (10), and wherein each starter block (15) comprises a cavity (20) having a non-horizontal surface (23) for supporting a cast product,
a manifold (5) for distributing liquid metal from a reservoir to each of the casting molds (10) of the plurality of casting molds (10),
a device (D) to determine a presence or absence of water (21) in the cavity (20) of the starter block (15), the device comprising
a sensor (30) for generating a wave (25), and for detecting a reflected wave (25),
wherein the sensor (30) is arranged and configured such that the sensor (30) detects the wave (25) that is reflected on a horizontal surface of water (21) in the cavity (20) and does not detect the wave (25) reflected on the non-horizontal surface (23) of the starter block (15), a controller (35) configured to determine that water (21) is present in the cavity (20) if the sensor (30) detects the reflected wave (25) and to determine that water (21) is absent in the cavity (20) if the sensor (30) is not detecting the wave (21) while the sensor (30) is generating the wave (25).

5. The Direct Chill (DC) casting equipment (50) according to claim 4,
wherein the equipment (50) further comprises an apparatus (60) for moving the device (D) such as to determine the presence or absence of water (21) in the cavity (20) of each starter bock (15) of the plurality of starter blocks (15) sequentially.

6. The Direct Chill (DC) casting equipment (50) according to claim 5, wherein the apparatus (60) for moving the device (D) comprises
at least one vertical beam (65) that is horizontally moveable on a floor (70) surrounding the casting pit (71) along a side of the casting pit (71),
a horizontal beam (75) having a longitudinal end portion (76, 77) that is connected to the at least one vertical beam (65) and is moveable in a vertical direction along the vertical beam (65), and
the device (D), wherein the sensor (30) is connected to the horizontal beam (75) and is moveable in a longitudinal direction along the horizontal beam (75).

7. The Direct Chill (DC) casting equipment (50) according to claim 6, further comprising a water removal device (80) to remove water (21) from the cavity (20) of a starter block (15) if the presence of water (21) was determined by the device (D), said device being provided on the horizontal beam (75) such as to be moveable in a longitudinal direction thereof.

8. The Direct Chill (DC) casting equipment (50) according to claim 5, wherein the apparatus (60) for moving the device (D) comprises a first vertical beam (65) and a second vertical beam (65), wherein the first and second vertical beams (65) are both horizontally moveable and are arranged on the floor (70) at opposite sides of the casting pit (71), wherein the horizontal beam (75) comprises a first (76) and a second (77) end portion on opposite longitudinal ends thereof, and wherein the first end portion (76) is connected to the first vertical beam (65) and wherein the second end portion (77) is connected to the second vertical beam (65) such that the horizontal beam (75) is vertically moveable.

9. The Direct Chill (DC) casting equipment (50) according to claim 4, further comprising a water removal device (80) to remove water (21) from the cavity (20) of a starter block (15) if the presence of water (21) was determined by the device (D).

10. The Direct Chill (DC) casting equipment (50) according to claim 4, wherein the wave comprises electro-magnetic radiation or an ultrasonic wave.

* * * * *